United States Patent
Jun

(10) Patent No.: US 8,169,725 B2
(45) Date of Patent: May 1, 2012

(54) HARD DISK DRIVE AND METHOD FOR MANAGING SCRATCHES ON A DISK OF THE HARD DISK DRIVE

(75) Inventor: Jin-Wan Jun, Seoul (KR)

(73) Assignee: Seagate Technology International, Grand Cayman (KY)

( * ) Notice: Subject to any disclaimer, the term of this patent is extended or adjusted under 35 U.S.C. 154(b) by 1525 days.

(21) Appl. No.: 11/645,173

(22) Filed: Dec. 26, 2006

(65) Prior Publication Data

US 2007/0146921 A1 Jun. 28, 2007

(30) Foreign Application Priority Data

Dec. 27, 2005 (KR) ........................ 10-2005-0130803

(51) Int. Cl.
*G11B 27/36* (2006.01)
(52) U.S. Cl. .......................................... 360/31; 360/25
(58) Field of Classification Search .................. None
See application file for complete search history.

(56) References Cited

U.S. PATENT DOCUMENTS

| 6,411,458 | B1 * | 6/2002 | Billings et al. | 360/75 |
| 7,139,145 | B1 * | 11/2006 | Archibald et al. | 360/53 |
| 2004/0236985 | A1 * | 11/2004 | Durica et al. | 714/7 |
| 2005/0138464 | A1 * | 6/2005 | Chong et al. | 714/5 |

FOREIGN PATENT DOCUMENTS

| JP | 2000-057501 | 2/2000 |
| JP | 2001-176001 | 6/2001 |
| JP | 2004-335087 | 11/2004 |

* cited by examiner

*Primary Examiner* — Daniell L Negron
*Assistant Examiner* — Regina N Holder
(74) *Attorney, Agent, or Firm* — Volentine & Whitt, PLLC

(57) ABSTRACT

A method for managing scratches on a disk of a hard disk drive is disclosed. By dividing the disk into a plurality of evaluation groups, testing each evaluation group for defects, calculating line equations based on the detected defects and determining whether the defects of the evaluation groups appreciably conform to their respective line equations, scratch fill operations may be appropriately performed using the line equations.

17 Claims, 7 Drawing Sheets

HARD DISK DRIVE AND METHOD FOR MANAGING SCRATCHES ON A DISK OF THE HARD DISK DRIVE

BACKGROUND OF THE INVENTION

1. Field of the Invention

The present invention relates to hard disk drives, and a method for managing scratches on hard disk drives This application claims priority under 35 U.S.C. §119 from Korean Patent Application No. 10-2005-0130803, filed on 27 Dec. 2005, the disclosure of which is hereby incorporated by reference herein as if set forth in its entirety.

2. Description of Related Art

Hard disk drives (HDDs) are memory devices used to record and reproduce data by converting digital electronic pulses to tiny magnetic structures placed on a ferromagnetic medium. Since the HDD can access a large amount of data at high speed, it is widely used as an auxiliary memory device for computer systems.

Unfortunately, a given disk of the HDD itself may develop defects with use, or a defect may inadvertently be generated during manufacture. For example, during manufacture, a defect can be generated on a multilayered media disk due to scratches occurring as a head stack assembly is loaded on the disk. Further, as HDD technology evolves to enable HDDs to rotate at higher rpm speeds and/or the TPI (tracks per inch) and BPI (bits per inch) densities increase, the likelihood of scratches developing in various directions due to a mechanical shock (or other factors) increases. One type of defect highly likely to be generated are scratches running along an oblique line caused by a head that reciprocates while tracing a circular arc on a rotating disk.

Obviously, physical damage, such as scratches, can cause both loss of data and data capacity in a disk. Since the controllable basic unit of a disk in a HDD is a sector, a scratch that intersects any portion of a sector can result in the loss of the entire sector. Thus, it is desirable to minimize any disk damage due to scratches.

Since a sector having any defect is classified as a defective sector, recording or writing of data to the sector is usually prohibited. Thus, in the HDD manufacturing process, disks are scanned for defects, and the address of any sector having a defect is written to a "maintenance zone" on the disk dedicated to maintaining lists of defective sectors. Thus, when a user is accessing the disk, the user can be prevented from accessing a defective sector by first accessing the maintenance zone.

FIG. 1 is a flowchart for explaining the manufacturing process of a general HDD. As shown in FIG. 1, the manufacturing process of an HDD includes a mechanism assembly step 100, a servo write step 110, a function test step 120, a burn-in step 130, a final test step 140, and a shipping test, packaging and shipping step 150.

The purpose of the mechanism assembly step 100 is to assemble a head disk assembly (HDA). The HDA is a mechanical part of the HDD, and the assembly of the HDA is carried out in a clean room. Next, during the servo write step 110, a servo writer is used to write a servo write pattern on the surface of a disk for the servo control of an actuator.

The function test step 120 is a test step performed after coupling the HDA of step 100 and a printed circuit board (PCB) made in a PCB assembly step. The purpose of function test step 120 is to test whether the HDA and the PCB are appropriately coupled and operate normally.

The burn-in step 130 is next performed. The burn-in step requires the longest period of all the manufacturing steps of a HDD. Generally, a burn-in step is performed by a program (firmware) residing in the HDD while the HDD sits on a rack in a burn-in room. The burn-in step 130 allows a user to use the HDD normally by detecting disk defects in advance so as to later avoid using the defective areas.

Next, the "final test" step 140 is used to check whether an HDD that passed the earlier burn-in step 130 has also normally passed a defect processing step. Once the final test step 140 is completed, the HDD passes through the shipping test, packaging, and shipping step 150 where it is shipped as a complete product.

Note that in the burn-in step 130, a "defect detection test" is performed on the surface of a disk. The defect detection test includes a "read/write test", which is performed over the entire area of the surface of a disk while applying stress to a read/write channel whereby a microprocessor that controls the overall operation of the HDD makes the head of the HDD's actuator drift off track or changes the HDD's read/write channel parameter values.

During the read/write test, sectors having defects can be detected as data written to each sector will be later read and tested for one or more data errors. As mentioned above, the address of the sector containing a defect can be recorded in a special defect list located in a particular area on the disk, that is, in the maintenance zone on the disk. Subsequently, as the defect list can be used to avoid accessing defective sectors, an HDD having effectively defect-free performance is provided.

However, the defect detection test is not perfect—generally due to inaccuracies of the actuator head. Accordingly, a known filtering algorithm (i.e., a "scratch fill" algorithm) can be used to detect patterns of scratches to provide information as to where undetected defects can be expected to exist. Scratch fill algorithms basically look at the defects identified on the media and fill in gaps between closely spaced defects as these typically are indicative of continuous scratches in the media surface. This approach attempts to anticipate where sector defects that are not detected during generation of a defect list are likely to occur and essentially fill in the gaps, as well as pad the identified defects.

Unfortunately, conventional defect detection and predictions technologies do not adequately address spiral scratches running across the surface of a disk or other similar medium. Thus, it is difficult to perform a scratch fill operation for spiral scratches. Therefore, there is a need to effectively expect and manage disk defects due to spiral scratches.

BRIEF SUMMARY

An aspect of the present invention provides a hard disk drive in which a defect due to a spiral scratch generated on a disk can be effectively expected in advance and the defect is managed so that data read/write is performed with respect to a normal sector by skipping a sector that is expected to have a defect when a user uses an HDD, a method for managing scratches on a disk of the hard disk drive In an illustrative embodiment, there is provided a method for managing scratches on a disk of a hard disk drive which includes dividing the disk into a plurality of evaluation groups with each evaluation group having M number of contiguous tracks, testing each evaluation group for defects to determine a set of detected defects for each evaluation group, calculating a first line equation based on a track number and a sector number of each detected defect within a first evaluation group of the plurality of evaluation groups, determining whether the first evaluation group appreciably conforms to the first line equation and performing a scratch fill operation on one or more sectors of the first evaluation group based on the first line equation if the first evaluation group appreciably conforms to the first line equation.

In another illustrative embodiment, a hard disk drive includes a disk adapted to record and store information, and a controller adapted to detect defects on the disk and determine whether the disk likely has one or more spiral scratches.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
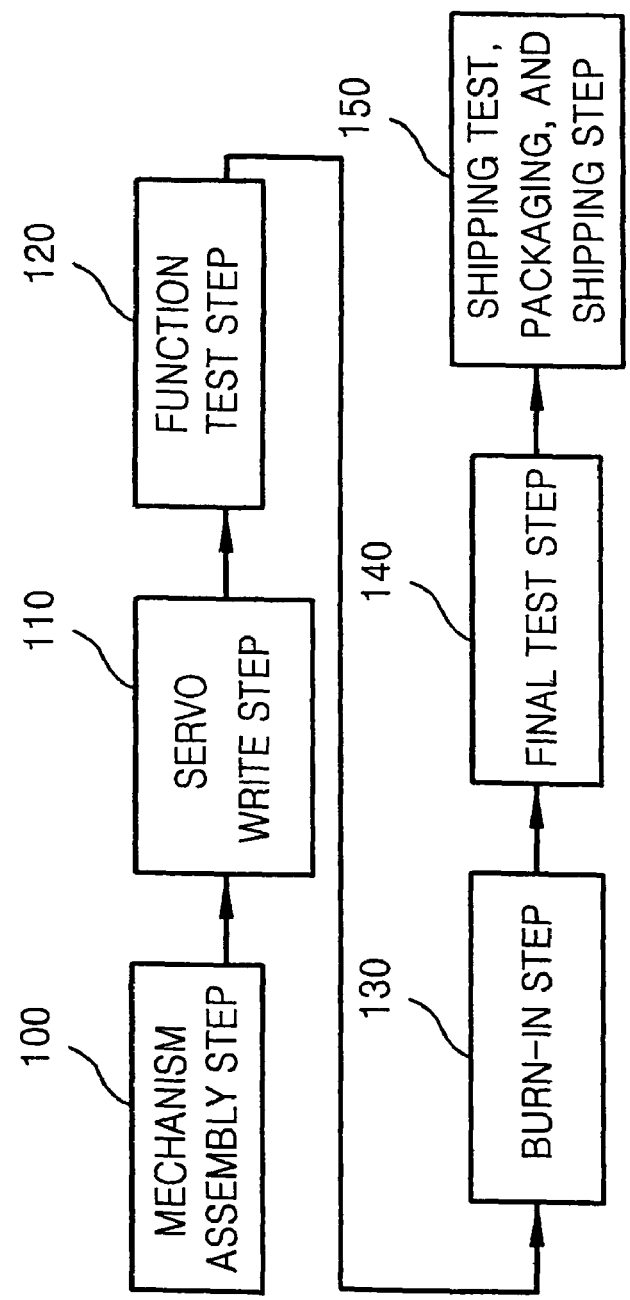
FIG. 1 is a flowchart for explaining the manufacturing process of a general hard disk drive.

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 2:
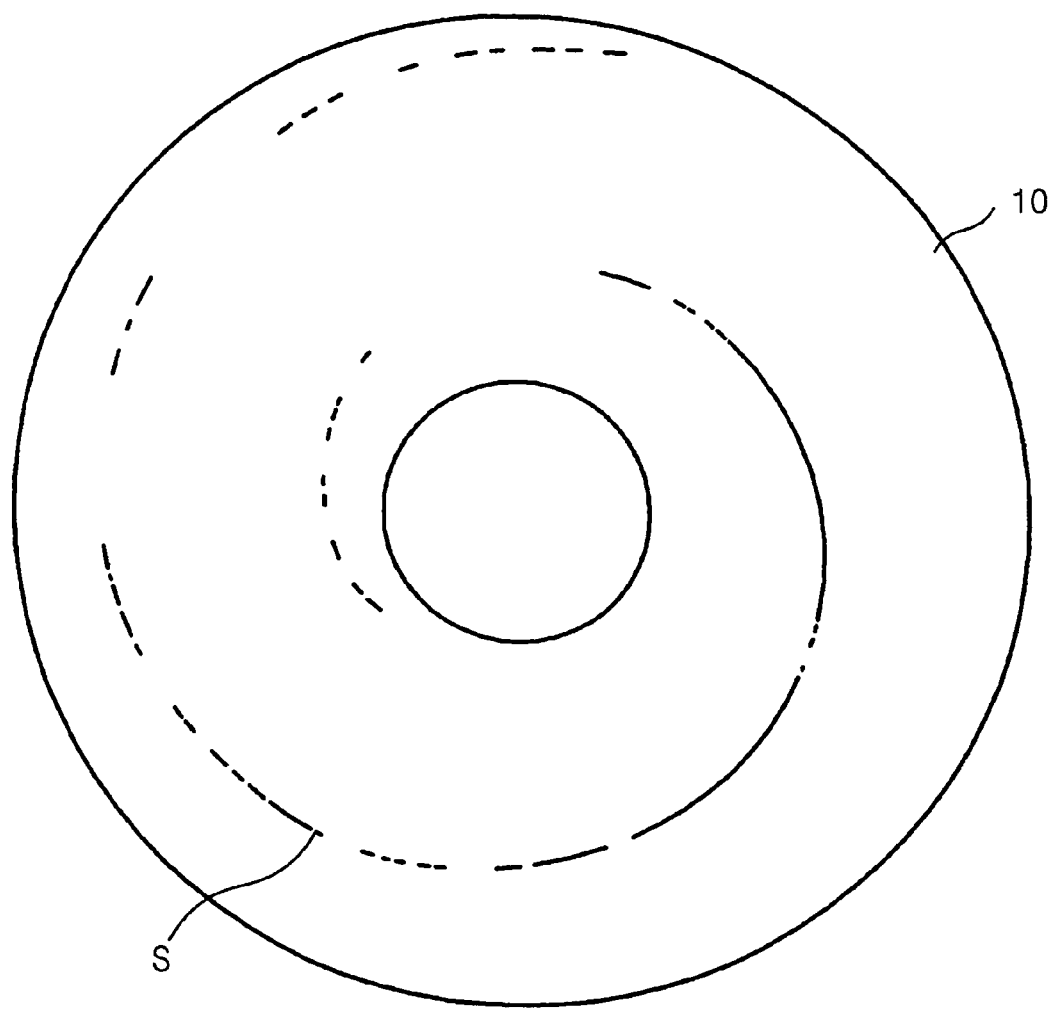
FIG. 2 is a view showing an example of a spiral scratch on a disk.

FIG. 2 shows an example of a disk 10 having a spiral scratch S. The exemplary spiral scratch S can be generated as the result of an errant trajectory of a read/write head on the disk 10 as the disk 10 spins. While not immediately apparent in FIG. 2, should the disk 10 be linearly mapped from a circular disk to a rectangle, the spiral scratch S will be transformed/mapped from a spiral curve into a continuous oblique line. As such, by obtaining an equation of the continuous oblique line, the spiral scratch S can be modeled for the entirety of the disk 10.

Figure 3:
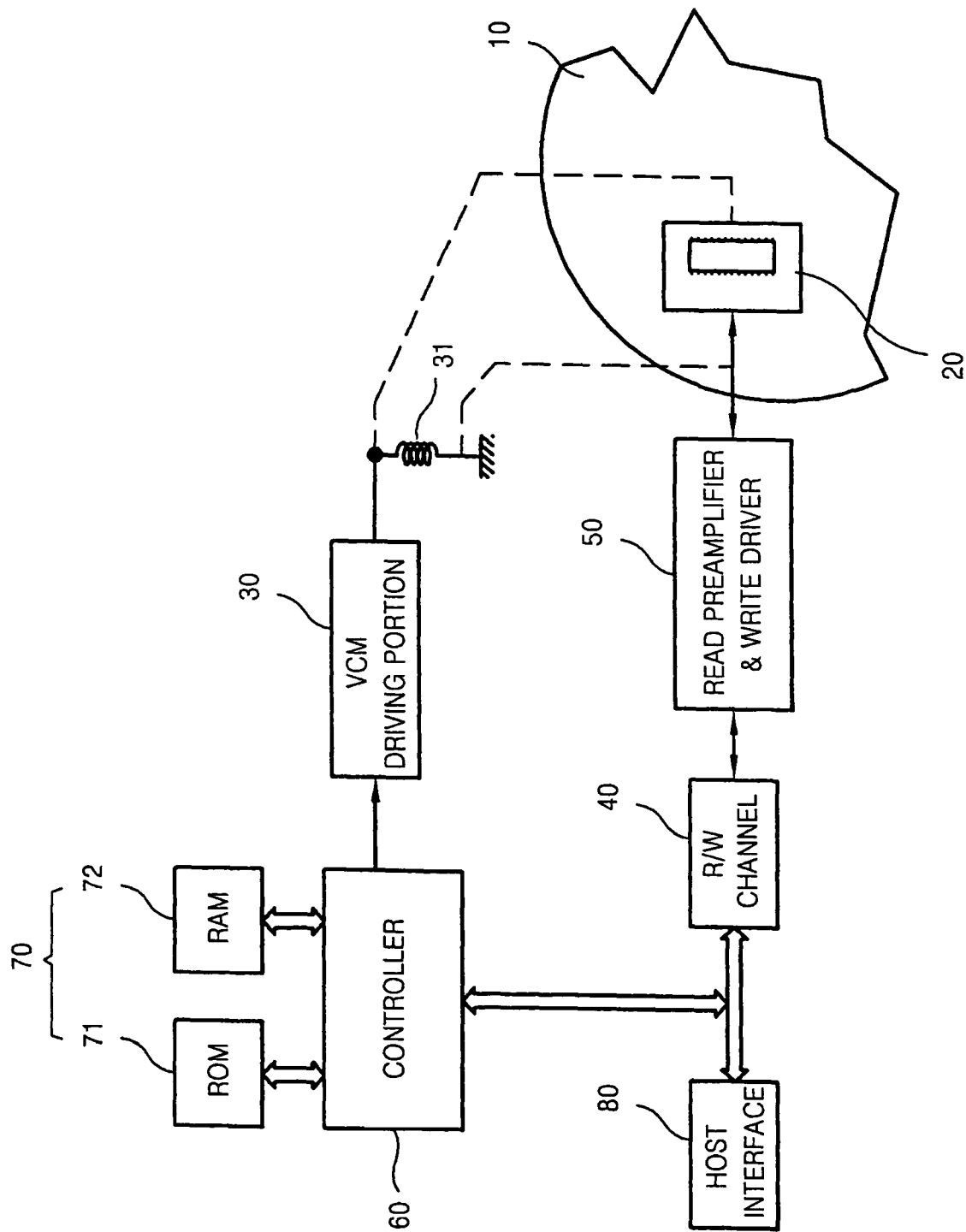
FIG. 3 is a block diagram of a driving circuit of a hard disk drive using a method for managing scratches on a disk of a hard disk drive according to an embodiment of the present invention.

FIG. 3 is a block diagram of a driving circuit of a hard disk drive using a method for managing scratches on a disk according to an illustrative embodiment of the present invention. As shown in FIG. 3, the exemplary hard disk drive includes a disk 10 having a spindle motor (not shown), a head 20 for reading/writing data from/to the disk 10, an actuator (not shown) for moving the head 20, a voice coil motor (VCM) 31, a VCM driver 30 for supplying drive current to the VCM 31 to control the driving of a VCM motor (not shown) and the movement of the head 20, and a controller 60 connected to the head 20 via a read/write (RAW) channel 40 and a read preamplifier & write driver 50. A memory 70 that includes a read only memory (ROM) 71 (or some other non-volatile memory such as a flash memory) and a random access memory (RAM) 72 is coupled to the controller 60.

Information is typically transmitted between the R/W channel 40 and a host interface 80, which can be used to couple the disk drive to a personal computer or other device.

Note that the memory 70 can contain commands and data used by the controller 60 to execute software routines. Such software routines can include a seek routine to move the head 10 from a first track to another track. The seek routine, in turn, can include a server control routine to guarantee the accurate movement of the head 20 to the desired track.

In a read operation, analog signals can be read by the head 20 from the disk 10, which in turn can be amplified by the read preamplifier & write driver 50 and demodulated by the RAW channel 40 to form digital signals. The digital signals, in turn, can provided to a host computer (not shown) via the host interface 80.

In a write operation, the RAN channel 40 can receive user data from the host computer via the host interface 80, and convert the received user data to a modulated analog signal. The modulated analog signal then can be provided to the read preamplifier & write driver 50 where it can be amplified and conditioned before being fed to the head 20 as a modulated current signal and imprinted on the disk 10.

The controller 60 may be a dedicated digital signal processor (DSP), a microprocessor or a microcontroller, or perhaps take the form as software or firmware in a related computer-based device. The controller 60 can supply a control signal to the RAN channel 40 to read data from the disk 10 or write data to the disk 10.

During a burn-in step, the controller 60 can determine whether defects exist on the disk 10. Using the information developed, one or more linear equations can be developed based on the sector number and track number of each defect location. Using the linear equations, a scratch fill operation can be performed to estimate those sectors where scratch-related defects may likely exists even though no such defects were directly detected during burn-in.

An exemplary process in which the controller 60 (or similar device) determines that defects may likely exist on a HDD due to a spiral scratch, even though not directly detected, is described below in detail.

Taking into account that spiral scratches can be modeled as lines when a disk is appropriately linearly mapped, a line equation, such as that of [Eq. 1], can be used for as the basis of a least-squares regression process:

$$y = \alpha + \beta x, \quad \text{[Eq. 1]}$$

where x is a HDD track number, y is a HDD sector number, $\beta$ is the slope of the line and $\alpha$ is the y-intercept of the line.

The x and y coefficients of the line model can be obtained using the following equations [Eq. 2]~[Eq. 5].

$$S_{xx} = \sum_{i=1}^{n} x_i^2 - \frac{\left(\sum_{i=1}^{n} x_i\right)^2}{n} \quad \text{[Eq. 2]}$$

$$S_{xy} = \sum_{i=1}^{n} x_i y_i - \frac{\left(\sum_{i=1}^{n} x_i\right)\left(\sum_{i=1}^{n} y_i\right)}{n} \quad \text{[Eq. 3]}$$

$$\beta = \frac{S_{xx}}{S_{xy}} \quad \text{[Eq. 4]}$$

-continued $$\alpha = \bar{y} - \beta\bar{x} \quad [\text{Eq. 5}]$$

where $x_i$ is a HDD track number of a measured defect i, $y_i$ is a HDD sector number of the measured defect i, Note that the set of defects {i=0, 1, 2, 3 . . . } can be restricted to a specific segment, i.e., a set of contiguous tracks, on a HDD. Such a set of defects can be referred to as an "evaluation defect group" while the set of tracks upon which these defects can be found can be referred to as an "evaluation track group."

It should be appreciated that the defects in each evaluation track group may or may not be due to a spiral scratch—or any scratch whatsoever. In order to differentiate which groups of defects are likely the result of a spiral scratch, it can be useful to develop a "correlation coefficient" for the defects.

A correlation coefficient r for the line equation of [Eq. 5] can be calculated by the following:

$$r = \frac{S_{xx}}{\sqrt{S_{xx}S_{xy}}} \quad [\text{Eq. 6}]$$

Note that the correlation coefficient r is a measure as to how well the defects in an evaluation defect group conform to the respective line model. The higher the correlation coefficient, the more likely the defects will look like a line. The lower the correlation coefficient, the more likely the defects will look less like a line. In various embodiments, it can be useful to set the correlation coefficient "threshold" to a predetermined value, such as 80%. Those evaluation groups having a correlation coefficient below this threshold will indicative that they are not related to a scratch as they will be scattered relatively far from the respective line model represented by [Eq. 5].

Among the evaluation track groups examined above, those having correlation coefficient surpassing the threshold will indicate that a spiral scratch exist within the respective segment of tracks, and will henceforth be referred to as "actual evaluation track groups" with their respective sets of defects referred to as "actual evaluation defect groups".

Note that while individual track/defect groups can be separately evaluated for scratch-related defects, it can be useful to determine whether any scratch from one group is related to (i.e., is a continuation of) a scratch from another group. Whether there is a scratch spanning multiple track groups may be determined based on the interactive continuity of the line equations of the actual evaluation track/defect groups. A process step for determining such interactive continuity is described below.

First, the sector number corresponding to the start track of the linear equation of the i-th actual evaluation track group is determined as the start sector of the i-th actual evaluation track group. For example, assuming a set of actual evaluation track groups (size 100 tracks) {1-100, 101-200, 401-500, 601-700 . . . } can be determined, the start track of the second track group (tracks {101-200}) is track 101.

The line equation of the i-th actual evaluation track group can then be further applied to the (i+1)th actual evaluation track group, and the sector number corresponding to the start track of the (i+1)th actual evaluation track group can be set to the end sector of the i-th actual evaluation track group. For instance, using the example immediately above, the line equation for the second actual evaluation track group (tracks {101-200}) can be extended into the third actual evaluation track group (tracks {401-500}) and the line equation for the second actual evaluation track group can be solved for track 401.

Next, the line equation for the third actual evaluation track group (tracks {401-500}) can be solved for track 401. Then, should the results for the second and third line equations be the same (or reasonably close), then it may be assumed that the defects within the second and third actual evaluation track groups are caused by a common spiral scratch.

Once a spiral scratch is determined to exist, a scratch fill process may be performed so that scratch-related defects can be effectively managed in advance.

The scratch fill process can be performed to each actual evaluation track group such that sectors conforming to the actual evaluation track group's line equation may be marked as defective or possibly defective. Note however, that when at least one non-actual evaluation track group exists between the i-th and (i+1)th actual evaluation track groups (that are determined to be related to a single scratch), the possibility that defects in the intermediate track groups exist due to the same scratch is high due to the continuous nature of scratches. Thus, the line equation used for the scratch fill process applied to the i-th and (i+1)th actual evaluation track groups may be applied to the intermediate track groups.

Figure 4A:
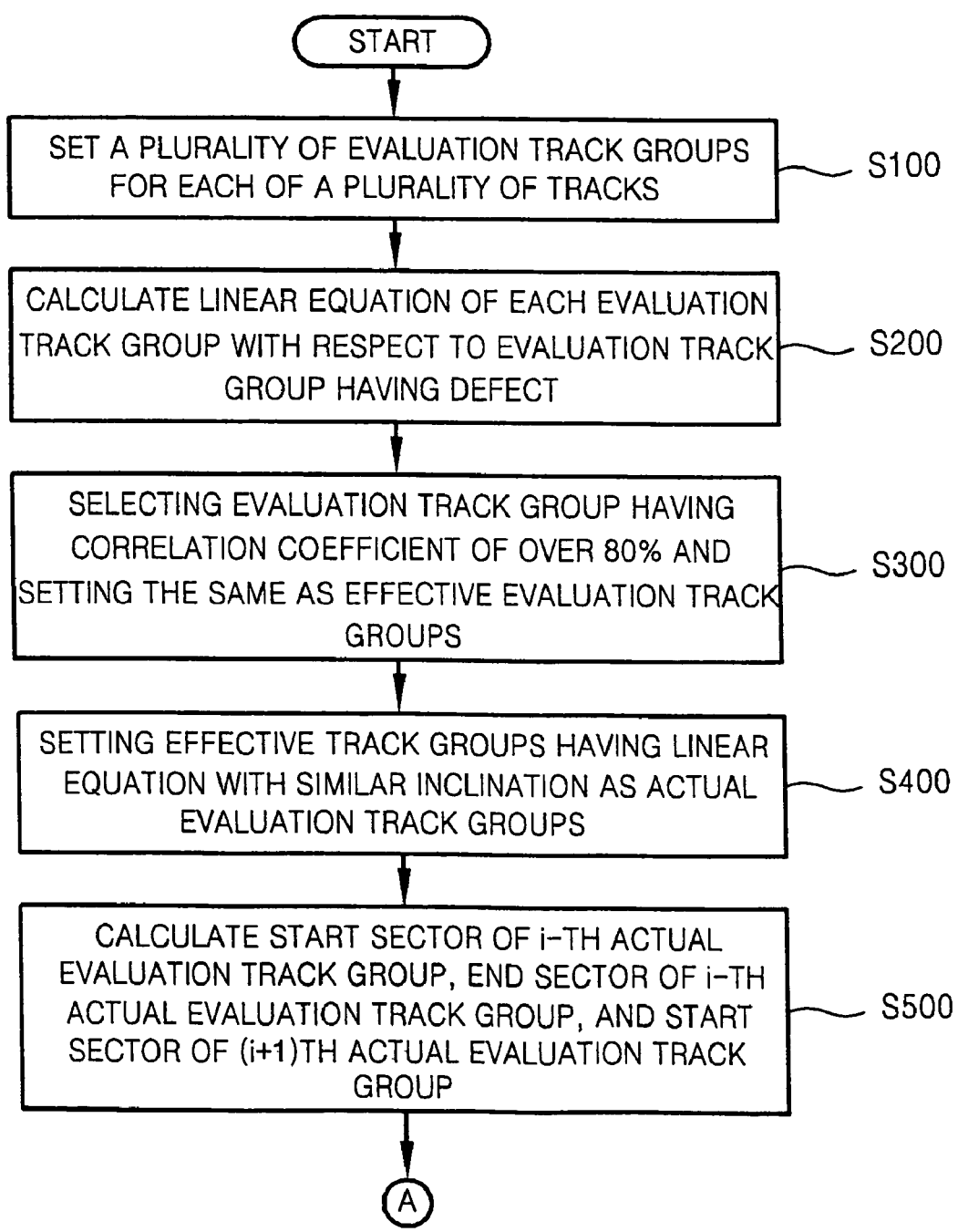
FIGS. 4A and 4B depict a flowchart for explaining the method for managing scratches on a disk of a hard disk drive according to an embodiment of the present invention.
Figure 4B:
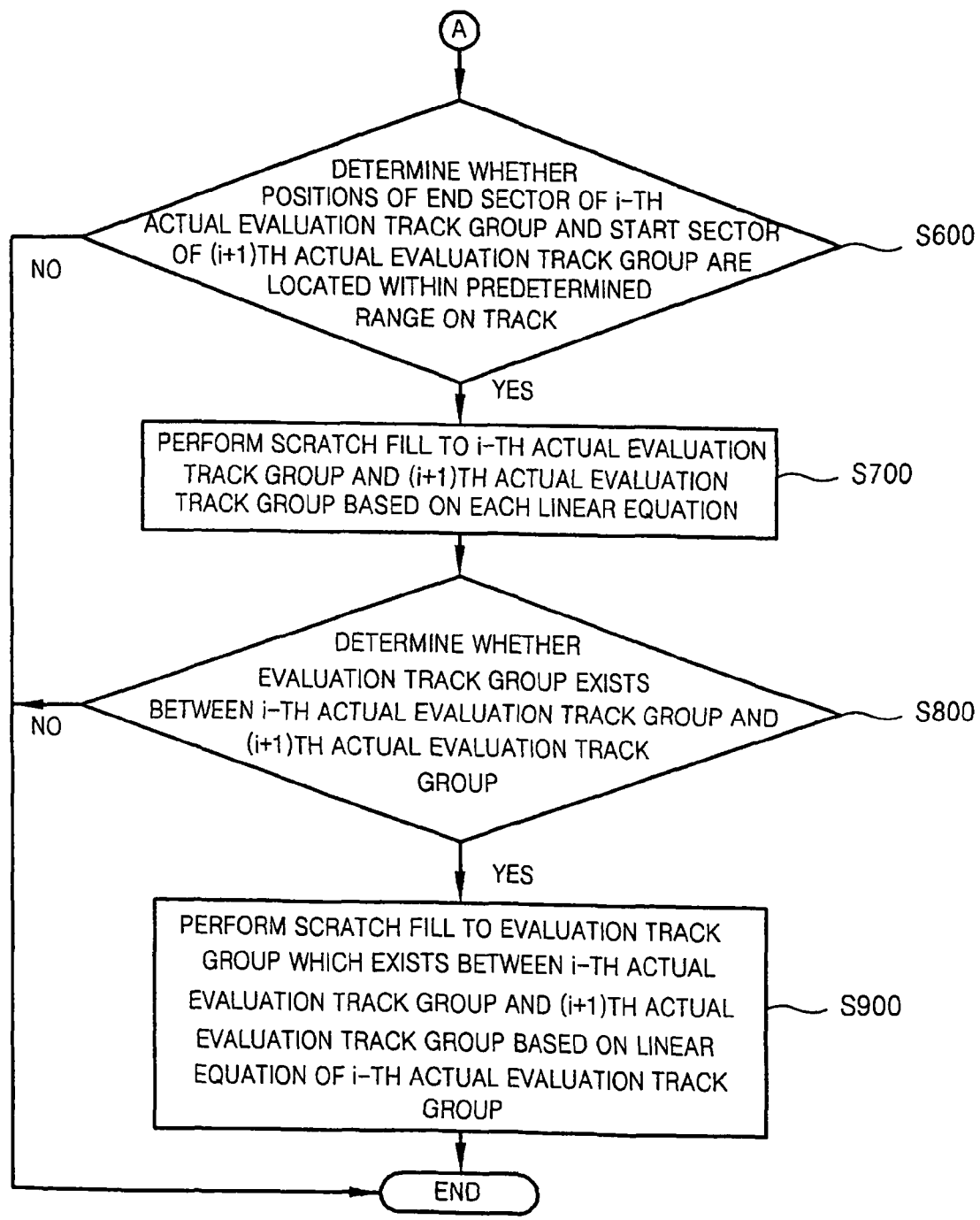
Figure 5:
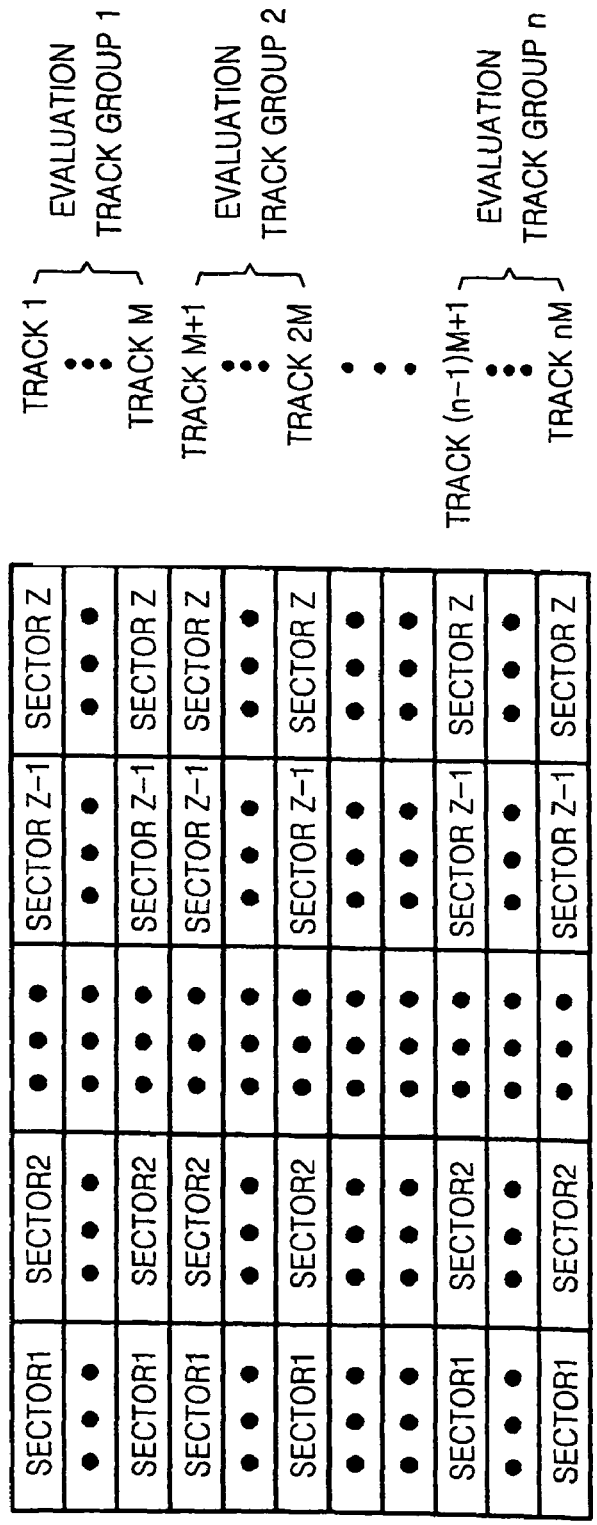
FIG. 5 is a view for explaining the step of setting an evaluation track group in the method for managing scratches on a disk of a hard disk drive of FIGS. 4A and 4B.
Figure 6:
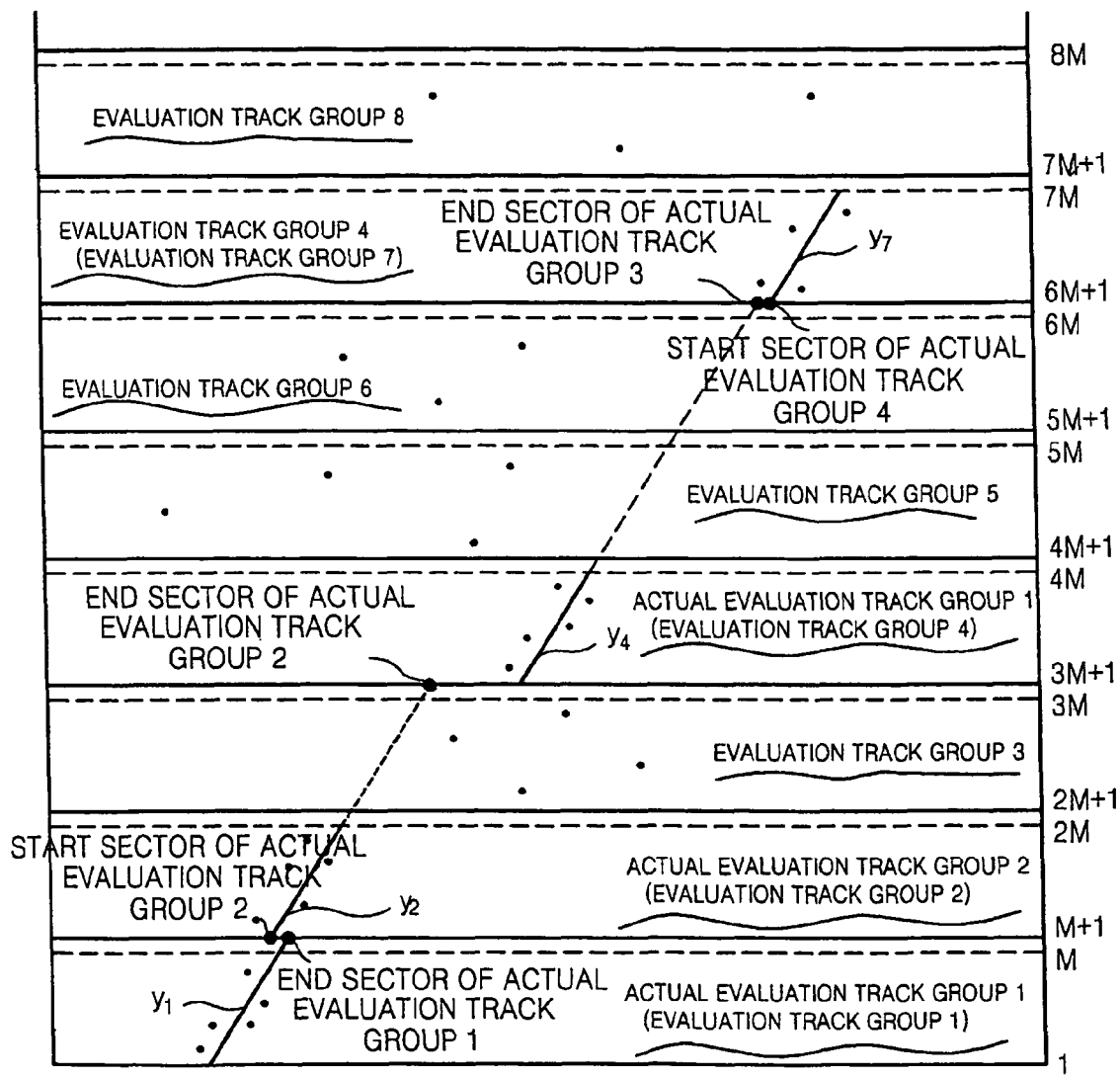
FIG. 6 is a view for explaining the process of determining the interactive continuity of a linear equation of each actual evaluation track group in the method for managing scratches on a disk of a hard disk drive of FIGS. 4A and 4B.

FIGS. 4A and 4B is a flowchart for explaining the method for managing scratches on a disk of a hard disk drive according to an embodiment of the present invention. FIG. 5 is a view for explaining the step of setting an evaluation track group in the method for managing scratches on a disk of a hard disk drive of FIGS. 4A and 4B. FIG. 6 is a view for explaining the process of determining the interactive continuity of a linear equation of each actual evaluation track group in the method for managing scratches on a disk of a hard disk drive of FIGS. 4A and 4B.

Referring to FIGS. 4-6, a method of managing scratches on a disk of the hard disk drive according to an embodiment of the present invention is described below.

To detect a spiral scratch, an area on the disk 10 (a start track through an end track) is selected for evaluation. The area is then divided/classified into groups with each group having a plurality of tracks and a plurality of evaluation track groups are established (S100). For example, as shown in FIGS. 5 and 6 the disk 10 is shown divided into track evaluation group 1 (tracks 1~M), track evaluation group 2 (tracks M+1~2M), track evaluation group 3 (tracks 2M+1~3M) and so on. Although the number of tracks belonging to each evaluation track group can be set arbitrarily, the number of tracks in the present embodiment is set to one-hundred (100). Thus, evaluation track group 1 is defined to be from track 1 to track 100, the evaluation track group 2 is defined to be from track 101 to track 200 and so on.

When defects are distributed over a number of evaluation track groups, a line model of each evaluation track group can be calculated using a linear regression model, such as the one shown above with regard to Eqs. 1-6, based on the defect distribution within the respective track evaluation group (S200). The coefficients of the linear equation can be obtained from Eqs. 1-5. Subsequently, the correlation coefficient between the track number and the sector number in each evaluation track group is obtained from Eq. 6.

An evaluation track group having the correlation coefficient of over a predetermined threshold (e.g., 80%) can be determined to be an effective evaluation track group (S300). Again note that the threshold value can be changed from embodiment to embodiment as may be found desirable or advantageous. Note, however, that when a correlation coefficient is below 80%, defects are widely distributed. This, in turn, implies that the resultant line model is not necessary, which infers that it may be preferable not to use the line model.

Any evaluation track groups conforming to a line equation can be deemed to be effective evaluation track groups. Further, multiple effective evaluation track groups having line equations with a similar slope "β" may be part of a single actual evaluation track groups (S400). For a better understanding of above-described steps, the example shown in FIG. 6 will be described in detail. As shown in FIG. 6. the actual evaluation track groups set by the above described steps are evaluation track group 1, evaluation track group 2, evaluation track group 4 and evaluation track group 7. The linear equations corresponding to the evaluation track groups set as the actual evaluation track groups are y1, y2, y4, and y7. The evaluation track group 1, the evaluation track group 2, the evaluation track group 4, and the evaluation track group 7 correspond to actual evaluation track group 1, actual evaluation track group 2, actual evaluation track group 3, and actual evaluation track group 7, respectively.

The sector number corresponding to the start track of the area of the actual evaluation track group 1 is calculated using the equation y1. This sector number is referred to as the start sector "y1_SECTOR_START" of the actual evaluation track group 1 (S500). The sector number where track 1 of the actual evaluation track group 1 crosses the equation y1 corresponds to the start sector "y1_SECTOR_START".

Next, the equation y1 can be further applied to the next area, that is, the actual evaluation track group 2, to calculate the sector number corresponding to the start track of the actual evaluation track group 2. This sector number is referred to as the end sector "y1_SECTOR_END" of the actual evaluation track group 1 (S500). In the present embodiment, since M is 100, the start track of the actual evaluation track group 2 is track 101, and thus the sector where the track 101 crosses the equation y1 corresponds to end sector "y1_SECTOR_END".

The sector number corresponding to the start track of the area of the actual evaluation track group 2 is calculated using the equation y2. This sector number is referred to as the start sector "y2_SECTOR_START" of the actual evaluation track group 2 (S500). Since the start track of the actual evaluation track group 2 is track 101, it is the sector where track 101 crosses the equation y2 that is to be start sector "y2_SECTOR_START".

Likewise, the line equation y2 can be further applied to the next area (actual evaluation track group 3 (the evaluation track group 4)) to calculate the sector number corresponding to the start track of the actual evaluation track group 3 (the evaluation track group 4). This sector number is referred to as end sector "y2_SECTOR_END" of the actual evaluation track group 2 (S500). Since the start track of the actual evaluation track group 3 is 301, the sector where the track 301 crosses the equation y2 corresponds to as end sector "y2_SECTOR_END".

Continuing, the continuity between the actual evaluation track group 1 and the actual evaluation track group 2 can be checked by determining whether the calculated value of the end sector "y1_SECTOR_END" of the actual evaluation track group 1 and the calculated value of the start sector "y2_SECTOR_START" of the actual evaluation track group 2 match each other or are within a particular range (S600). That is, when the value of the end sector "y1_SECTOR_END" of the actual-evaluation track group 1 and the value of the start sector "y2_SECTOR_START" of the actual evaluation track group 2 match each other or are within a particular range, the defects in the two areas can be determined to be continuously generated in a single oblique line.

The continuity between the actual evaluation track group 3 (the evaluation track group 4) and the actual evaluation track group 4 (the evaluation track group 7) can also be determined in the above-described method. Consequently, when the actual evaluation track groups have line equations that continue as above exist, it can be determined that a spiral scratch exists.

When a spiral scratch is determined to exist, a scratch fill process can be performed. Generally, when the value of an end sector, e.g., "y1_SECTOR_END" of the actual evaluation track group 1, and the value of a start sector, e.g., "y2_SECTOR_START" of the actual evaluation track group 2, match each other (or are within a particular range) so that the continuity between the actual evaluation track group 1 and the actual evaluation track group 2 is affirmed, the defects in the two areas can be determined to be continuously generated in a single oblique line. Thus, in this case, the sector numbers can be calculated using the linear equation of each actual evaluation track group, and the scratch fill operation can be performed to the corresponding sector number (S700).

Note that in the present example of FIG. 6 evaluation track groups 5-6 exist between the actual evaluation track group 3 (the evaluation track group 4) and the actual evaluation track group 4 (the evaluation track group 7) (S800). Further note that there are no detected defects in evaluation track groups 5-6 consistent with actual evaluation track group 3 and the actual evaluation track group 4. However, the possibility that such defects exist in evaluation track groups 5-6 is high nonetheless. Accordingly, linear equation y4 of the actual evaluation track group 3 can be used to perform a scratch fill operation for evaluation track groups 5-6 (S900).

As described above, according to the disclosed methods for managing scratches on a disk of a hard disk drive according to an embodiment of the present invention, a defect due to a spiral scratch generated on the disk 10 can be effectively expected and managed. In the above-described embodiment, a plurality of evaluation track groups, each including one-hundred tracks, are set with respect to the tracks subject to a test to detect a scratch on the disk 10 are described. However, it should be appreciated that in various other embodiments, the number of tracks can vary (more or less) from one-hundred. Also, while in the above-described embodiments the use of a correlation coefficient of over 80% is described, in other embodiments the 80% figure can be changed according to the specific circumstances.

Although a few embodiments of the present invention have been shown and described, the present invention is not limited to the described embodiments. Instead, it should be appreciated by those skilled in the art that changes may be made to these embodiments without departing from the principles and spirit of the invention, the scope of which is defined by the claims and their equivalents.

As described above, according to the present invention, by assuming in advance that defects due to spiral scratches may exist, a number of likely defective sectors can be marked as defective and removed from use. Accordingly, by removing these likely defective sectors from use, the overall quality of disk storage products may be increased.

What is claimed is:

1. A method for managing spiral scratches on a disk of a hard disk drive comprising:
   dividing the disk into a plurality of evaluation groups with each evaluation group having M number of contiguous tracks, wherein M is a positive integer;

testing each evaluation group for defects to determine a set of detected defects for each evaluation group;

calculating a first line equation based on a track number and a sector number of each detected defect within a first evaluation group of the plurality of evaluation groups;

determining whether the first evaluation group conforms to the first line equation; and performing a scratch fill operation on one or more sectors of the first evaluation group based on the first line equation if the first evaluation group conforms to the first line equation.

2. The method of claim 1, wherein the step of determining includes: calculating a first correlation coefficient for the first line equation; and comparing the first correlation coefficient to a correlation coefficient threshold.

3. The method of claim 1, wherein the correlation coefficient threshold is approximately 80%.

4. The method of claim 1, further comprising:

calculating a second line equation based on a track number and a sector number of each detected defect within a second evaluation group of the plurality of evaluation groups;

determining whether the second evaluation group appreciably conforms to the second line equation; and performing a scratch fill operation on one or more sectors of the second evaluation group based on the second line equation if the second evaluation group conforms to the second line equation.

5. The method of claim 4, further comprising testing for continuity between the first line equation and the second line equation to determine whether the first and second line equations are related to a common spiral scratch.

6. The method of claim 5, wherein the step of testing includes:

solving the first line equation using a track of the second evaluation group to produce a first result;

solving the second line equation using the same track of the second evaluation group to produce a second result; and comparing the first result to the second result.

7. The method of claim 5, wherein the track used to solve the first and second line equations is the first track of the second evaluation group.

8. The method of claim 5, wherein the track used to solve the first and second line equations is an end track of the second evaluation group.

9. The method of claim 6, wherein if the first and second line equations are related to a common spiral scratch, solving the first line equation using a plurality of tracks for at least one intermediate evaluation group physically located between the first evaluation group and the second evaluation group on the disk.

10. The method of claim 6, wherein if the first and second line equations are related to a common spiral scratch, performing a scratch fill process using at least one of the first and second line equations on a plurality of tracks of at least one intermediate evaluation group physically located between the first evaluation group and the second evaluation group on the disk.

11. The method of claim 1, wherein the step of calculating the first equation is performed using a linear regression model on the detected defects within the first evaluation group.

12. A hard disk drive comprising:

a disk adapted to record and store information;

a controller adapted to detect defects on the disk and determine whether the disk likely has one or more spiral scratches; and a memory accessible to the controller that when accessed by the controller can enable the controller to determine whether the disk likely has one or more spiral scratches, wherein the memory includes:

a set of instructions for dividing the disk into a plurality of evaluation groups with each evaluation group having M number of contiguous tracks, wherein M is a positive integer;

a set of instructions for testing each evaluation group for defects to determine a set of detected defects for each evaluation group;

a set of instructions for calculating a first line equation based on a track number and a sector number of each detected defect within a first evaluation group of the plurality of evaluation groups;

a set of instructions for determining whether the first evaluation group conforms to the first line equation; and a set of instructions for performing a scratch fill operation on one or more sectors of the first evaluation group based on the first line equation if the first evaluation group conforms to the first line equation.

13. The hard disk drive of claim 12, wherein the set of instructions for the step of determining includes:

a set of instructions for first correlation coefficient for the first line equation; and a set of instructions for comparing the first correlation coefficient to a correlation coefficient threshold.

14. The hard disk drive of claim 12, wherein the memory further includes:

a set of instructions for calculating a second line equation based on a track number and a sector number of each detected defect within a second evaluation group of the plurality of evaluation groups;

a set of instructions for determining whether the second evaluation group conforms to the second line equation; and a set of instructions for performing a scratch fill operation on one or more sectors of the second evaluation group based on the second line equation if the second evaluation group conforms to the second line equation.

15. The hard disk drive of claim 14, wherein the memory further includes:

a set of instructions for testing for continuity between the first line equation and the second line equation to determine whether the first and second line equations are related to a common spiral scratch.

16. The hard disk drive of claim 15, wherein the memory further includes a set of instructions for solving the first line equation using a plurality of tracks of at least one intermediate evaluation group physically located between the first evaluation group and the second evaluation group on the disk.

17. The hard disk drive of claim 14, wherein the set of instructions for solving the first line equation using a plurality of tracks of at least one intermediate evaluation group is conditioned upon whether the first and second line equations are related to a common spiral scratch.

* * * * *